July 11, 1967 G. L. CLAPPER 3,330,973

BI-POLAR TRANSIENT DETECTOR

Original Filed Dec. 21, 1961

INVENTOR
GENUNG L. CLAPPER

BY G. R. Gugger
AGENT

United States Patent Office 3,330,973

Patented July 11, 1967

3,330,973
BI-POLAR TRANSIENT DETECTOR

Genung L. Clapper, Vestal, N.Y., assignor to International Business Machines Corporation, New York, N.Y., a corporation of New York Continuation of application Ser. No. 161,182, Dec. 21, 1961. This application Nov. 16, 1964, Ser. No. 413,394

2 Claims. (Cl. 307—88.5)

ABSTRACT OF THE DISCLOSURE

A bridge circuit including a diode connected in each leg thereof with a transistor connected base-emitter through two legs of the bridge to obtain a signal from said transistor on positive or negative transient input signals.

This invention relates to a transient detector circuit and more particularly to a bi-polar transient detector circuit for producing a positive going pulse during the time of input transitions, whether negative or positive. This application is a continuation of my application Ser. No. 161,182, filed Dec. 21, 1961, now abandoned.

There are a number of applications, such as in sound analysis work, for example, where it is desirable to scan a number of input signal lines to a storage matrix or the like and detect changes occurring in the input signals. In this connection, when analyzing the frequency components present in a complex speech signal, it was found especially desirable to be able to produce a pulse for whatever change occurs in any input line, whether it be a positive flowing ON change or a negative flowing OFF change.

Most ordinary differentiators will select either a negative or a positive transient and put out a pulse only for the selected transient. In attempting to provide a transient detector which would put out a positive pulse for both a "turn on" and "turn off" condition, it was found that a single active element, such as a transistor, could be coupled to a bridge rectifier circuit. With one side of the bridge circuit connected to the base of a PNP type transistor and the other side connected to the emitter, the PNP transistor will act in two configurations. Whenever the input change is negative, the transistor will act as a grounded emitter because a negative pulse is being fed to the base. However, when the input change is positive, the transistor will act as a grounded base because a positive pulse is being fed to the emitter. In either case, the transistor produces a positive output. An NPN type transistor could be used just as well with the necessary supply voltages reversed in polarity to produce a negative output, if desired.

A feature of the present circuit is that it can change an AC signal to two specifically different pulses which, for example, may be a short duration pulse on the input and a long duration pulse on the output. This has proved very useful in that the beginning of the change pulse can produce a short positive going pulse of about 30 microseconds' duration that is well suited to operate a ring drive pulse generator for advancing a ring which controls the V-lines of a storage matrix. The end of the change pulse can produce a positive going pulse of 150 microseconds' duration which, through a sample pulse generator, will allow the information to be read into the storage matrix.

Accordingly, a principal object of the present invention is to provide a bi-polar transient detector circuit for producing a positive going pulse during the time of input transitions, whether the transitions are negative or positive.

A further object of the present invention is to provide a transient detector circuit including a single active element which produces a positive output pulse for both a "turn on" and "turn off" condition.

A still further object of the present invention is to provide a transient detector circuit for changing an AC signal to two specifically different pulses.

A further object is to produce a bi-polar transient detector circuit as in the preceding object and wherein the output pulse durations match the input transition times.

A still further object of the present invention is to provide a transient detector circuit which detects the time variation between the leading and trailing edge of an input signal.

The foregoing and other objects, features and advantages of the invention will be apparent from the following more particular description of a preferred embodiment of the invention, as illustrated in the accompanying drawings.

Figure 1:
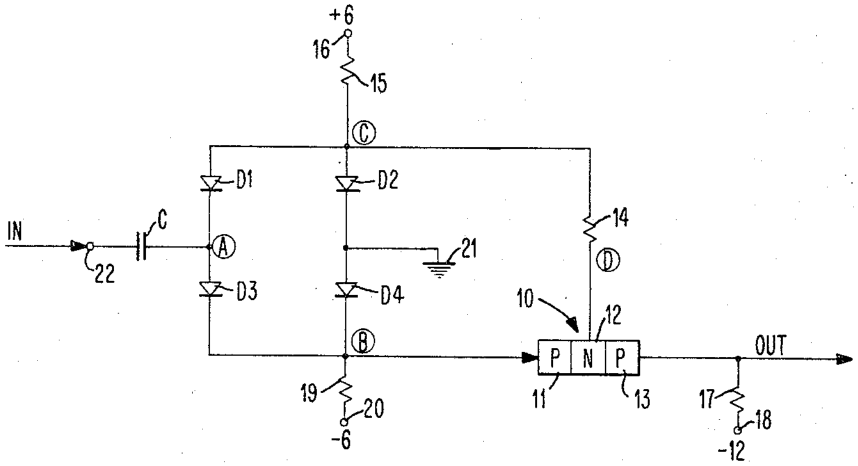
FIG. 1 is a schematic circuit of a bi-polar transient detector according to the present invention.
Figure 2:
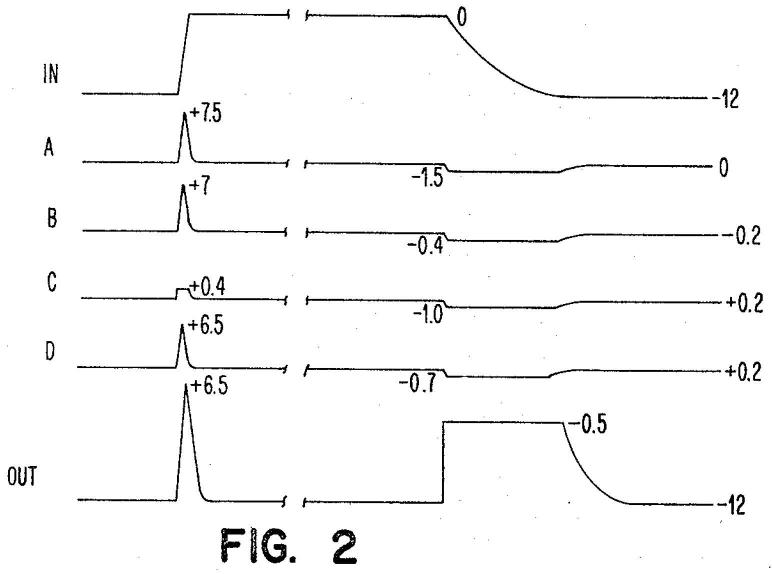
FIG. 2 is a diagram showing representative waveforms for the circuit of FIG. 1.

Referring to FIG. 1, the circuit comprises a PNP transistor 10 having an emitter electrode 11, base electrode 12 and a collector electrode 13. The base electrode is connected by way of resistors 14 and 15 to a positive 6 volt terminal 16 and the collector electrode is connected by way of a resistor 17 to a negative 12 volt terminal 18. The emitter electrode is connected by way of a resistor 19 to a negative 6 volt terminal 20.

Shown connected between a source of ground potential 21 and an input capacitor C is a bridge rectifier comprising the diodes D1, D2, D3 and D4. One side of the bridge rectifier is connected to the emitter electrode 11 and the other side is connected to the base electrode 12.

Transistor 10 will be normally cut off as a result of current flowing through the forward biased diodes D2 and D4. The drop in these diodes will be substantially equal and, giving the resistors 15 and 19 a value of 47K each, points B and C will normally be at negative 0.2 volt and positive 0.2 volt, respectively. Point A, the mid-point of diodes D1 and D3, will be near 0 volts. With the input terminal 22 at negative 12 volt, the input capacitor is charged to 12 volts.

A positive input transient from negative 12 volts to 0 volt will drive point A to about positive 7.5 volts. Current then flows through the diode D3, the emitter-base diode of transistor 10, resistor 14, and diode D2 to ground. The transistor conducts current through the collector electrode 13 to the output which rises sharply to ground and then follows the emitter, point B, to about positive 6.5 volts. At the end of the input transient, current ceases to flow, the transistor cuts off, and the output returns to the negative 12 volt level.

The negative input transient from 0 volt to negative 12 volts drives the voltage at point A to only negative 1.5 volts. Current now flows from ground through the diode D4, the emitter-base diode of the transistor, the resistor 14, diode D1 to point A. While the input falls fast enough to maintain base current in the transistor, an amplified collector current flows to create an output pulse. Toward the end of the negative input transient, the current reduces until the net base current is zero. The transistor is now cut off and the output drops to negative 12 volts.

From the foregoing it is evident that transistor 10 acts as a grounded base amplifier for the positive input transient because under these circumstances a positive pulse is being fed to the emitter and it acts as a grounded emitter inverting amplifier for the negative transient because a negative pulse is being fed to the base and both of these result in a positive output. In this way, the sharp rise time and slow fall time of the input is faithfully represented by the output waveforms and the output pulse durations match the input transitions. Without a clamp diode, the short pulse amplitude will be greater than normal. This may be an advantage in some cases to detect the beginning pulse on an amplitude basis. The circuit may, therefore, be used to detect the transition times of the input waveform. Several inputs to a matrix, for example, could be monitored by the bi-polar transient detectors and the outputs mixed to produce a "change pulse." The monitored lines would then be sampled at times of no change.

It will also be noted that the present circuit acts like two different differentiators since the width of the output pulse is roughly proportional to the transient condition of the input. The reason for this is because the transistor is essentially a current controlled device and as long as an input change is occurring, current will be feeding through the transistor. Of course, as soon as the input change stops, current will stop feeding and this is true for either circuit through the bridge rectifier and transistor. For example, considering the negative going trailing edge of the input, there is a gentle slope and current will be constantly fed during the slope to keep the transient transistor turned on so that it will constantly put out a pulse. As soon as the input pulse stops or gets to a certain value, the transistor will start to turn off. Most differentiators are only an approximation to a differentiator whereas the present circuit is more truly a differentiator in that it will actually put out a pulse during the time of the input transient change. In addition, the present circuit is capable of recognizing the difference between the input transients.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A transient detector circuit for producing an output pulse in response to input transitions from a transient signal source comprising (a) a transistor amplifier, (b) a low impedance circuit from the emitter of said amplifier to a reference potential, (c) a higher impedance circuit from the base of said amplifier to the reference potential, (d) bias means for said high and low impedance circuit to maintain the base-emitter junction nonconducting in the absence of an input signal, (e) an input circuit including a capacitor connected to the junction of a first and second diode, said first diode being oriented such that a negative excursion of transient signal applied to said capacitor will be transferred through said first diode, said second diode being oriented such that a positive excursion of transient signal applied to said capacitor will be transferred through said second diode, (f) means for connecting said input circuit across said base-emitter junction and in said high impedance path to said base so that the negative excursion of a transient signal will be applied to the base and the positive excursion of a transient signal will be applied to said emitter, (g) whereby a positive signal to said emitter will bias the amplifier to conduction or a negative signal to said base will bias said amplifier to conduction.

2. A transient detector circuit for producing an output pulse in response to input transitions from a transient signal source comprising (a) a PNP amplifier including emitter, base and collector, (b) a first and second diode connected in series across said base-emitter junction and polarized in the opposite direction from said emitter-base junction, (c) a resistor connected in the above circuit between the base and said first diode, (d) a source of reference potential connected to a junction between said diodes, (e) bias means connected to the emitter and base for biasing said amplifier to nonconduction in the absence of a signal, (f) an input circuit including a capacitor connected to the junction of a third and fourth diode, said third diode being oriented such that a negative excursion of transient signal applied to said capacitor will be transferred through said third diode, said fourth diode being oriented such that a positive excursion of transient signal applied to said capacitor will be transferred through said fourth diode, (g) means for connecting said input circuit across said base-emitter junction and in series with said resistor so that the third diode is connected in series with said base and said fourth diode is connected in series with said emitter, (h) whereby a positive signal to said emitter will bias the amplifier to conduction or a negative signal to said base will bias said amplifier to conduction.

References Cited

UNITED STATES PATENTS

| | | | |
|---|---|---|---|
| 2,775,714 | 12/1956 | Curtis | 307—88.5 |
| 2,908,828 | 10/1959 | Thompson | 307—88.5 |
| 3,054,068 | 9/1962 | De Jong | 330—24 |

ARTHUR GAUSS, *Primary Examiner.*

S. D. MILLER, *Assistant Examiner.*